P. L. HEDRICK.
PNEUMATIC FLUME GATE.
APPLICATION FILED APR. 19, 1916.
1,209,156.
Patented Dec. 19, 1916.
2 SHEETS—SHEET 1.
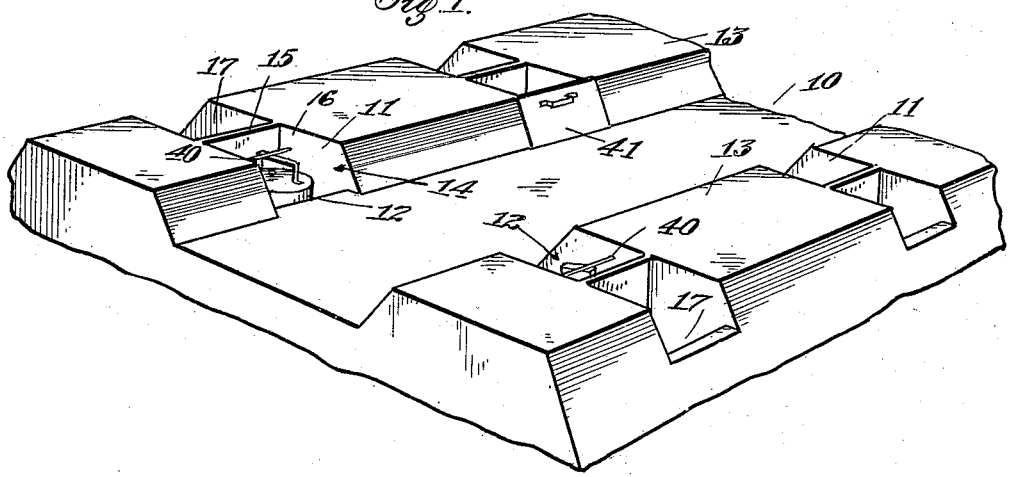
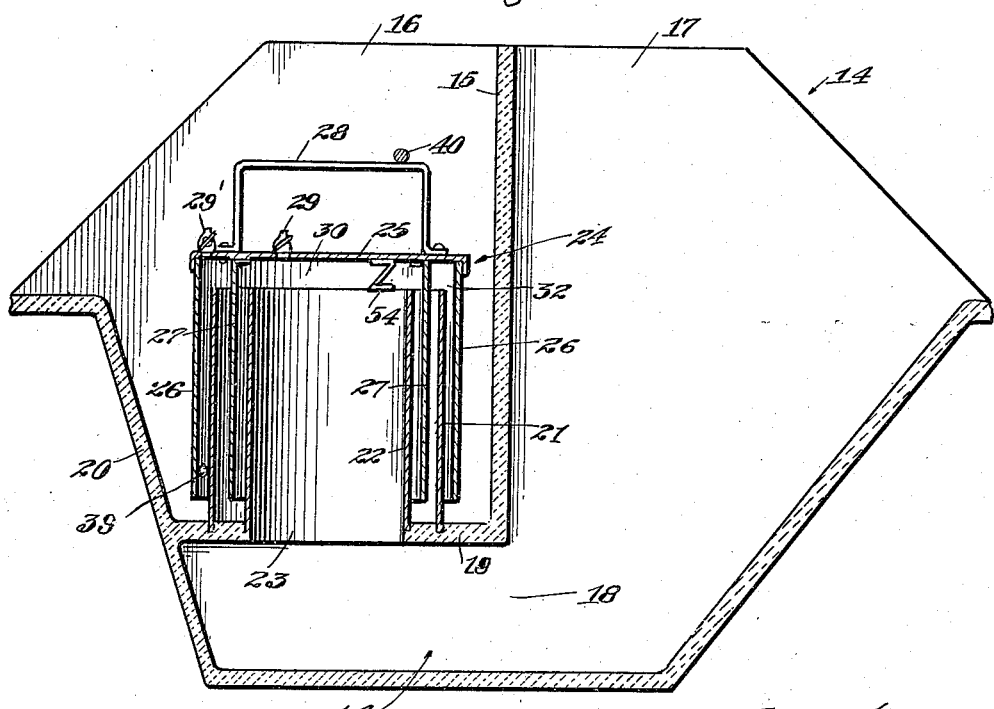
Inventor,
Perry L. Hedrick.

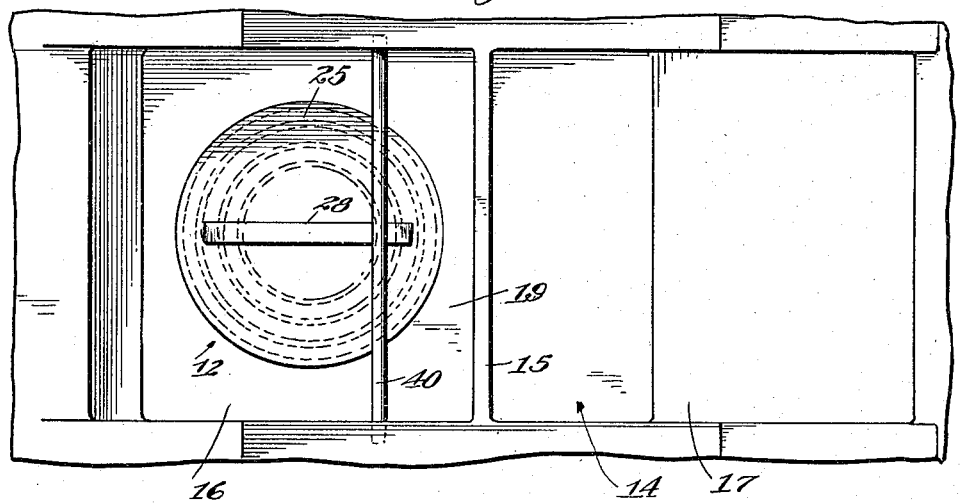

UNITED STATES PATENT OFFICE.

PERRY L. HEDRICK, OF EL CENTRO, CALIFORNIA.

PNEUMATIC FLUME-GATE.

1,209,156.  Specification of Letters Patent.  Patented Dec. 19, 1916.

Application filed April 19, 1916. Serial No. 92,187.

*To all whom it may concern:*

Be it known that I, PERRY L. HEDRICK, a citizen of the United States, residing at El Centro, in the county of Imperial and State of California, have invented new and useful Improvements in Pneumatic Flume-Gates, of which the following is a specification.

My invention relates to a pneumatic flume gate especially adapted for use with irrigation systems.

It is an object of this invention to construct a headgate which is absolutely watertight, and although of small depth may be multiplied in its effectiveness.

Another object of this invention is to provide a gate, the seat of which is not dependent upon any contacting parts, which are usually subject to wear and repair.

Another object is to provide a gate that will automatically prevent the water from overflowing the canal banks.

It is another object of this invention to provide a pneumatic headgate whereby water from an irrigation canal or the like may be passed from a higher to a lower level. The gate is provided with automatic means for permitting the flow of the water when the level in the irrigation canal exceeds a pre-determined level.

With the foregoing and other objects which will appear as the description proceeds, my invention consists in the construction, combination and arrangement of parts hereinafter described and claimed.

In the accompanying drawings which form a part of this specification, I have illustrated a convenient and practical embodiment of my invention, and in which:

Figure 1 is a perspective view of a section of an irrigation canal provided with a plurality of pneumatic headgates for controlling the flow of water to the ground to be irrigated. Fig. 2 is a cross sectional view through the center of the pneumatic headgate and the adjacent distributing ditch. Fig. 3 is a top plan view thereof.

10 designates an irrigation canal supplying water to a plurality of irrigation ditches or lands or checks 11, 11, the flow of water from said canal to said ditches or lands or checks being controlled by pneumatic headgates 12, 12. I have shown the bottom and sides of the canal and ditches as well as the levees 13, 13 constructed of cement or concrete. A shallow concrete lined pit 14 connects the irrigation canal 10 with the land to be irrigated. A vertical transverse partition wall 15, preferably of concrete, extends downwardly, the lower end of said wall being spaced from the bottom of pit 14. This wall 15 divides the pit 14 into two trap chambers 16 and 17, which are open at the top and communicate with each other through the passage 18 which is formed by the lower end of wall 15 and the bottom of the pit. A horizontal wall 19 provided with a circular opening 23 extends from the base of the wall 15 across to the opposite side wall 20 of the chamber 16. A pair of vertical concentric cylindrical thimbles 21 and 22 extend upwardly from the wall 19, the upper ends being at substantially the same level as the bottom of the irrigation canal 10, the lower ends of said thimbles making a water tight joint with the horizontal wall 19. The inner thimble 22 is open at both ends, the circular opening corresponding to the internal diameter of the thimble 22. A duplex cover 24 comprising a circular top plate 25 from which a pair of concentric thimbles 26 and 27 in air tight connection therewith extend vertically downward in straddling relation to the stationary thimbles 21 and 22. As clearly shown in Fig. 2, the cover thimble 26 surrounds the outer stationary thimble 21. The inner cover thimble 27 is disposed between the stationary thimbles. A handle 28 fastened to thimble 26 or to top plate 25 is provided whereby said cover may be lifted or entirely removed from the chamber 16. A horizontal rod 40 extending transversely between the lateral walls of the headgate opening is provided, which serves to maintain the multiple cover in position on the stationary thimbles 21 and 22. The stationary rod 40 is placed close to partition wall 15, less than one-half the diameter of cover plate 25 away therefrom, so that the handle may be turned under rod 40 and the buoyancy of the cover, due to the water head, resisted by rod 40. Air valves 29 and 29' are mounted on the top plate 25 being in communication with the central chamber 30 within the inner stationary thimble 22 and with the annular space formed by the outer and inner cover thimbles 26 and 27, respectively. A sniff hole 39 is provided in the outer cover thimble 26 near the lower end thereof for the purpose of breaking the siphonage, when water in the canals is allowed to become high enough to force the multiple trap and start siphonage.

Assuming that there is no water in the trap chambers 16 and 17 or between the thimbles 21 or 22, and the water is turned on in the irrigation canal 10 and that the cover 24 is in position as shown in Fig. 2, the air valves being closed, the water will pass between the stationary thimbles 21 and 22 and the thimbles 26 and 27 flowing over the upper edge of the inner thimble 22. As soon as the level of the water in the chambers 16 and 17 rises to the horizontal wall 19, the air in the central chamber 30 will be imprisoned and offer resistance to the flow of the water. It will be obvious that for any given vertical position of the cover 24, a certain head of water in the canal is required to overcome the resistance to the flow of water through the pneumatic headgate.

It is not necessary to provide any means for adjusting the height of the multiple cover which is either locked in position entirely down or is entirely withdrawn, allowing the water from the canal to pass through the gate to the irrigating ditch, except that the regulator may be hooked in position to partially restrict the flow. The distance between the thimbles 21, 26, 27 and 22, is quite small, one-eighth of an inch or less of space between said thimbles being sufficient. With thimbles near together, more resistance is offered to the water and the volume of water passing between said thimbles is so reduced that siphonage does not take place, while if the cover is pushed down and there is an area between the thimbles equal to the area of the opening 30, it is difficult and well-nigh impossible to prevent siphonic action when shoving the cover into position.

When it is desired to allow the flow of water through the gate without regulation, it is merely necessary to open the air valves 29 and 29' allowing the air within the central opening 30 and in the annular space between the thimbles 26 and 28 of the multiple cover to escape. In this case, cover thimbles are held up from the horizontal wall 19 by placing a stirrup 54 under the cover plate 25 which stirrup holds the cover up and free from stationary thimbles and makes a space for the water to pass.

Against high heads of water, the gate is closed as follows: The air valves 29 and 29' being closed and the cover entirely filled with air having been brought to the surface of the water, the water is held back by using a temporary slide gate 41 which is placed over the intake opening from the irrigating ditch leading into the structure, said slide gate 41 resting upon the inclined lateral wall of the canal on opposite sides of the intake opening. With the head of water thus reduced, the multiple cover may be easily put in place, compressing the air and effectually trapping the air against the full head of water within the gate. The temporary slide 41 is then removed and carried forward and used with other gates.

The spaces between thimbles 27 and 22 and between 21 and 26 will be full of air while the space between 21 and 27 will contain water thus forming a second trap equal to the first. This water is forced out over the top of the thimble 22. If it is desired to start the flow of water through the headgate irrespective of the head of water in the canal, it is merely necessary to open the air valves 29 and 29', which, as stated before communicate with the central chamber 30 and the annular space between the cover thimbles 26 and 27. When the air valve is open, no resistance is offered to the flow of the water, but as soon as the water rises in the chambers 16 and 17 which act as a trap, the air within the central and annular chambers will be forced out through the air valve 29.

While I have shown two stationary thimbles and two cover thimbles, it will be understood that the pneumatic headgate may be constructed with but one or with more than two. Each additional pair of thimbles merely multiplies the head of water in the canal which is required to overcome the resistance of the imprisoned air within the gate after the trap chambers have been filled with water. Assuming that the vertical distance of a thimble is six inches and the depth of the trap, the same, a single cover and a single thimble would hold the water back to a height corresponding thereto, but a double thimble and cover with two thimbles, requires twice the head of water to overcome the resistance.

While I have shown and described a pneumatic headgate in the preferred mode of construction as now known to me, I do not confine myself to the details of the construction and combination as described, as various changes therein may be made by those skilled in the art without departing from the spirit of my invention as defined in the appended claims.

While I have shown my apparatus as applied to the distribution of water from a higher to a lower level in irrigating systems, it is obvious that the same is of general application, and may be used wherever it is desired to automatically regulate the flow of a liquid from a higher to a lower level. It may be used as an automatic gate seal, or the trap may be extended to form a stock watering trough, which will automatically fill as used without need of valves, floats or moving parts.

I claim:

1. In a pneumatic flume gate, the combination of a main canal, a ditch, a pit below the bottom of the main canal, a vertical partition wall dividing said pit into an anterior and a posterior chamber, said partition wall being spaced from the bottom of said pit, a horizontal partition wall connected to said vertical partition wall, a pair of fixed vertical cylindrical tubes concentrically arranged, extending upwardly from said horizontal wall, said tubes having open tops substantially on the same level as the bottom of the main canal, the inner tube being also open at the bottom and communicating with said posterior chamber, a cover for said tubes, said cover having a pair of cylindrical tubular members concentrically arranged and open at the bottom extending downwardly therefrom, the inner of said members projecting downwardly between the annular space formed between said fixed tubes, the outer of said members surrounding the outer tube, means disposed between said cover and said tubes for maintaining said cover in spaced relation to said tubes, means locking said cover in adjusted vertical position, and independent air cocks on the cover communicating with the annular space formed between the inner and outer cylindrical members and with said inner tube, respectively.

2. In a pneumatic flume gate, the combination of a main canal, a ditch, a pit below the bottom of the main canal, a vertical partition wall dividing said pit into an anterior and a posterior chamber, a connecting passage between said chambers, a pair of fixed vertical tubes concentrically arranged in said anterior chamber, said tubes being open at the top, the inner tube being also open at the bottom and communicating with said passage, a cover for said tubes, said cover having a pair of tubular members concentrically arranged and open at the bottom extending downwardly from said cover, the inner of said members projecting downwardly between the annular space formed between said tubes, the outer member surrounding the outer tube, means for maintaining said cover in spaced relation to said tubes, means coöperating with said cover for preventing upward movement of the latter and independent air cocks communicating with the annular space formed between the inner and outer tubular members and with the inner tube, respectively.

3. In a pneumatic flume gate, the combination of a main canal and a ditch connected therewith, a pair of fixed vertical tubes forming a passage between said canal and said ditch, said tubes having their tops open and substantially on the level with the bottom of said main canal, the inner tube being also open at the bottom and forming a connecting passage between said canal and said ditch, a cover for said tubes having a pair of tubular members concentrically arranged and open at the bottom extending downwardly therefrom, the inner of said members projecting downwardly between the annular space formed between said tubes, the outer of said members surrounding the outer tube, means for spacing said cover from said tube, and means for preventing upward movement of said cover.

4. In a pneumatic flume gate, the combination of a main canal and a ditch connected therewith, a pair of fixed vertical tubes forming a passage between said canal and said ditch, said tubes having their tops open and substantially on the level with the bottom of said main canal, the inner tube being also open at the bottom and forming a connecting passage between said canal and said ditch, a cover for said tubes having a pair of tubular members concentrically arranged and open at the bottom extending downwardly therefrom, the inner of said members projecting downwardly between the annular space formed between said tubes, the outer of said members surrounding the outer tube, and means for spacing said cover from said tube.

In testimony whereof I have signed my name to this specification.

PERRY L. HEDRICK.

Copies of this patent may be obtained for five cents each, by addressing the "Commissioner of Patents, Washington, D. C."